United States Patent [19]

Balbaa et al.

[11] Patent Number: 5,191,183
[45] Date of Patent: Mar. 2, 1993

[54] APPARATUS FOR PROCESSING CERAMICS USING MICROWAVE OVEN WITH RESISTANCE HEATING UNIT

[75] Inventors: Ibrahim S. Balbaa, Mississauga; Steven J. Oda, Etobicoke, both of Canada

[73] Assignee: Ontario Hydro, Toronto, Canada

[21] Appl. No.: 658,694

[22] Filed: Feb. 21, 1991

[51] Int. Cl.⁵ .............................................. H05B 6/80
[52] U.S. Cl. .................... 219/10.55 M; 219/10.55 A
[58] Field of Search ........ 219/400, 10.55 R, 10.55 M; 204/157.43

[56] References Cited

U.S. PATENT DOCUMENTS

| | | | |
|---|---|---|---|
| 3,858,329 | 1/1975 | Koite et al. | 219/10.55 R |
| 3,920,944 | 11/1975 | Constable | 219/10.55 M |
| 4,188,520 | 2/1980 | Dills | 219/10.55 B |
| 4,236,055 | 11/1980 | Kaminaka | 219/10.55 B |
| 4,242,554 | 12/1980 | Hurko | 219/10.55 B |
| 4,262,183 | 4/1981 | Smith et al. | 219/10.55 R |
| 4,304,974 | 12/1981 | Ikeda et al. | 219/10.55 F |
| 4,351,998 | 9/1982 | Keppel et al. | 219/10.55 R |
| 4,375,441 | 3/1983 | Adam et al. | 264/25 |
| 4,410,779 | 9/1984 | Weiss | 219/10.55 R |
| 4,480,164 | 10/1984 | Dills | 219/10.55 R |
| 4,523,387 | 6/1985 | Mahan | 34/1 |
| 4,533,809 | 8/1985 | Eke | 219/10.55 M |
| 4,591,683 | 5/1986 | Eke | 219/10.55 B |
| 4,647,746 | 3/1987 | Eke | 219/10.55 B |
| 4,695,695 | 4/1985 | Meek | 219/10.55 M |
| 4,798,927 | 1/1989 | Kaminaka | 219/10.55 B |
| 4,831,227 | 5/1989 | Eke | 219/400 |
| 4,856,202 | 8/1989 | Radomsky | 34/10 |
| 4,880,578 | 11/1989 | Holcombe | 264/26 |
| 4,963,709 | 10/1990 | Kimrey | 219/10.55 R |
| 5,010,220 | 4/1991 | Apté et al. | 219/10.55 R |

FOREIGN PATENT DOCUMENTS

0336306 11/1989 European Pat. Off.
2180301 11/1973 France.

*Primary Examiner*—W. Gary Jones
*Assistant Examiner*—Dean Nguyen
*Attorney, Agent, or Firm*—Ridout & Maybee

[57] ABSTRACT

An apparatus for calcining and/or sintering ceramic materials comprising a kiln having a heating chamber formed from a microwave impermeable material separated from abutting secondary chambers containing conventional heating means by perforated walls, permitting convectional/radiative heat transfer from the secondary chambers into the heating chamber while minimizing leakage of microwave radiation from the heating chamber. A method for processing ceramic materials in the apparatus comprises applying convectional or convectional/radiative heat to elevate the temperature of a material to increase microwave coupling, and then applying microwave radiation to further elevate the temperature of the material and maintain a desired temperature for a desired length of time.

6 Claims, 4 Drawing Sheets

CALCINATION OF BARIUM TITANATE

SINTERING OF ZINC OXIDE

APPARATUS FOR PROCESSING CERAMICS USING MICROWAVE OVEN WITH RESISTANCE HEATING UNIT

FIELD OF THE INVENTION

This invention relates to a method and apparatus for manufacturing ceramic materials. In particular, this invention relates to a method and apparatus for sintering and calcining ceramic materials using a combination of conventional and microwave heating

BACKGROUND OF THE INVENTION

Conventional heating, typically comprising convectional or convectional/radiative gas or electric resistance heating, is commonly used to manufacture ceramic materials. However, the slow heating rate and poor temperature control associated with conventional heating methods results in a high energy consumption and inconsistent product quality.

Industrial heating by microwave radiation has been successfully used to accelerate the slip casting and drying of traditional ceramics. In comparison with conventional heating, microwave heating can provide a higher heating rate, where there is sufficient microwave absorption, with better temperature control, and thus results in a lower energy consumption and potentially a better quality product.

Devices which utilize a combination of conventional and microwave heating are known for use at relatively low temperatures. A common example is the combination microwave/convection oven for cooking food. Convection heating is employed for uniformity of cooking and for purposes of enhancing flavour.

Some industrial processes use a combination of convection and microwave heating, also at relatively low temperatures. For example, U.S. Pat. No. 4,375,441 discloses a combination of microwave and conventional heating to obtain uniform sintering of large, complexly configured or non-homogeneous polymeric articles in order to avoid overfusing of the interior due to uneven heating which may occur if only microwave heating is used. Conventional heating may thus be applied either prior to or subsequent to microwave heating.

However, the dielectric loss factor (a measure of microwave absorption) of most ceramic materials is heavily dependent on temperature. Most ceramic materials do not permit significant microwave coupling (microwave absorption) at low temperatures. Since the benefits of microwave heating can only be fully realized when the ceramic material being processed permits significant microwave coupling, it has been a common practice in microwave processing of ceramics to use additives or coupling agents to enhance microwave coupling.

It has been found that microwave coupling increases dramatically when the temperature of the ceramic is elevated above a threshold temperature, which varies according to the material being processed, at which the dielectric loss factor increases significantly.

By using a combination of conventional and microwave heating, the present invention more efficiently processes ceramic materials. According to the invention, conventional heating is applied to elevate the temperature of ceramic materials to the threshold at which there is a significant increase in microwave coupling, at which point microwave heating is applied. The invention thus reduces both processing time and energy consumption as compared to conventional heating or microwave heating processes.

The process of convectional or convectional/radiative heating followed by microwave heating also provides the advantage that the conventional heating phase elevates the ambient temperature of the workspace, thereby reducing the temperature gradient between the interior and the surface of the ceramic materials during the microwave heating phase. A better quality product should result.

Those skilled in the art will recognize that within the temperature ranges referred to in this specification the radiative component of energy produced by a conventional heating source, such as an electric resistance heating element, is insignificant. However, in certain materials the dielectric loss factor may not increase significantly until much higher temperatures are obtained, in which case the radiative (infrared) component may become significant. For this reason conventional heating as used herein includes convectional and radiative heating even though in the examples given below convectional heating is the only significant form of heat transfer in the conventional heating phase.

SUMMARY OF THE INVENTION

The present invention thus provides an apparatus for processing ceramic materials, comprising an insulated housing providing a heating chamber defining a workspace and a secondary chamber disposed adjacent to the heating chamber, the heating chamber having an interior microwaveimpermeable lining enclosing the workspace and access means permitting the materials to be placed in and removed from the workspace, conventional heating means in said secondary chamber, a microwave energy source and control means for selectively activating the microwave energy source when the ambient temperature in the workspace has reached a selected temperature, waveguide means coupled to the heating chamber for propagating microwave energy into the heating chamber, and a perforated wall separating the heating chamber and the secondary chamber to permit convectional and radiative heat transfer from the secondary chamber to the heating chamber.

The present invention further provides a method for processing ceramic materials at a desired temperature for a desired length of time, comprising the steps of applying convectional or convectional/radiative heat to elevate the temperature of a material to increase microwave coupling, applying microwave radiation to further elevate the temperature of the material to the desired temperature and maintain the material at the desired temperature for the desired length of time.

BRIEF DESCRIPTION OF THE DRAWINGS

In drawings which illustrate by way of example only a preferred embodiment of the invention.

Figure 1:
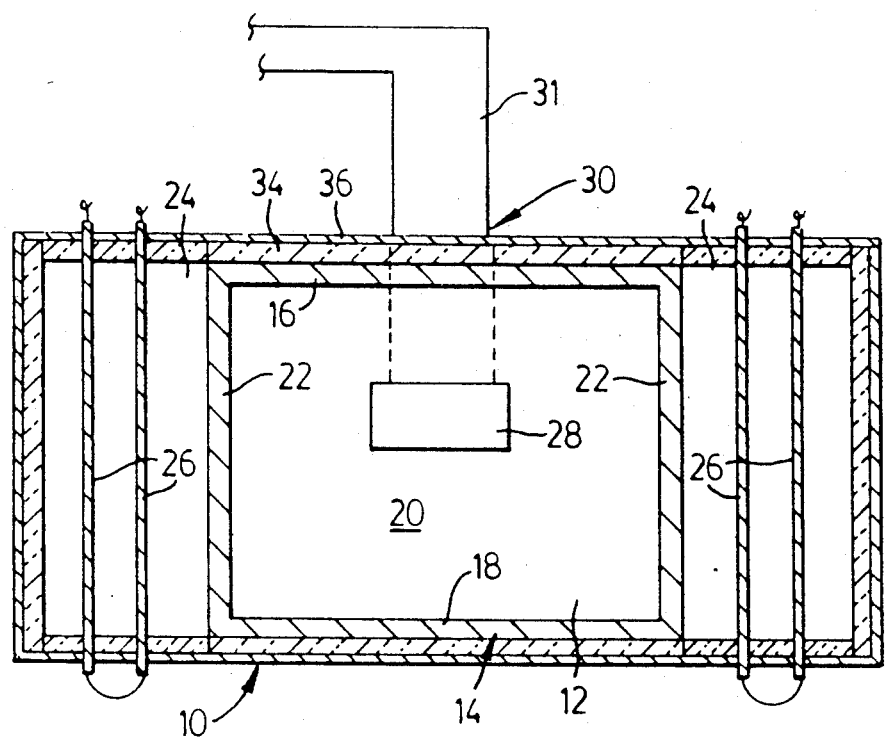
FIG. 1 is a cross-section of a kiln embodying the present invention.
Figure 2:
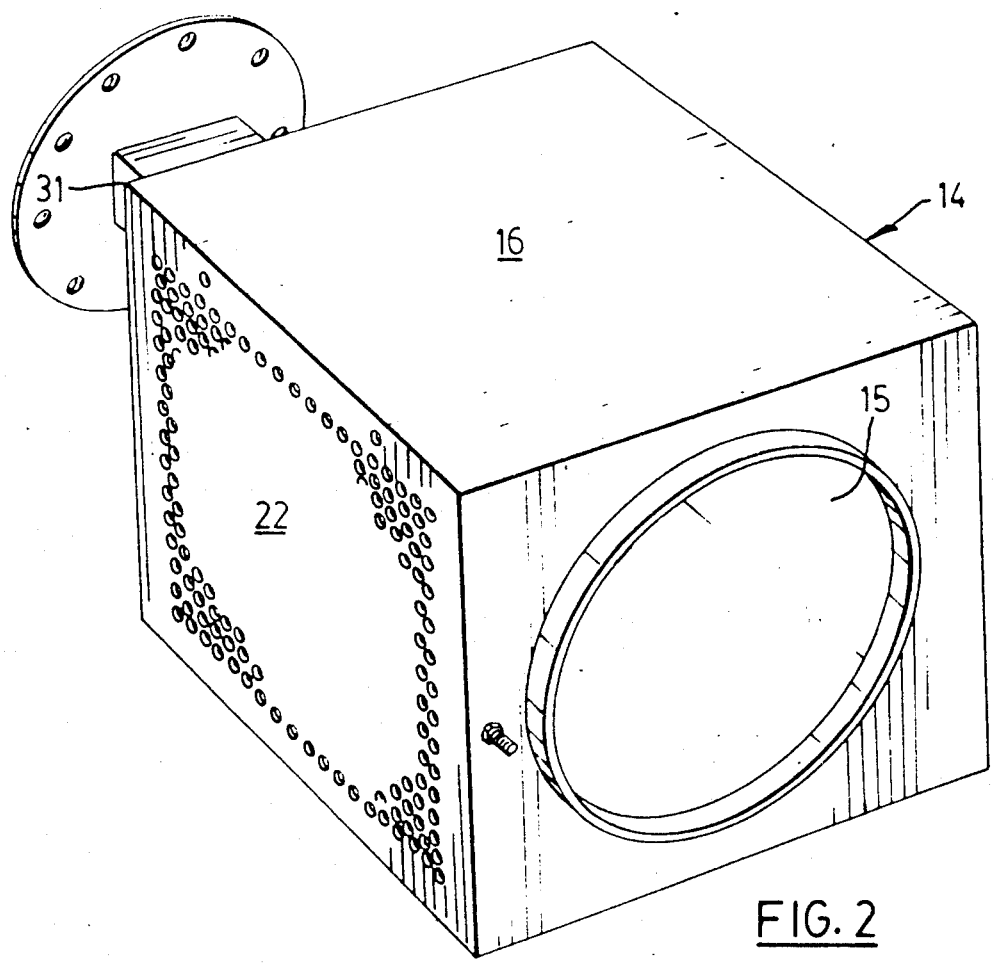
FIG. 2 is a perspective view of the heating chamber illustrated in the kiln of FIG. 1.

The present invention, illustrated in FIG. 1, comprises a workspace 12 defined by a heating chamber 14. The heating chamber, illustrated in FIG. 2, comprises a top 16, bottom 18, rear 20 and side walls 22 formed from a microwave-impermeable material which should preferably have a high electrical conductivity and be resistant to oxidation at temperatures in the range of 500° C.

The heating chamber 14 is contained within a thermally insulated kiln 10 having at least one abutting secondary chamber 24. Preferably secondary chambers 24 are disposed on either side of the heating chamber 14. The secondary chambers 24 contain conventional heating means such as electric resistance heating elements 26. The side walls 22 of the heating chamber 14 are perforated to permit convectional/radiative heat transfer from the heating elements 26 into the heating chamber 14 while minimizing leakage of microwave radiation from the heating chamber 14 to below an allowable industrial limit of 10 mW/cm².

The rear wall 20 of the heating chamber 14 includes an access port 28 for a microwave waveguide 30 through which the microwave generator (not shown) is coupled to the heating chamber 14. Temperature sensing means are provided in any convenient location within the heating chamber 14, and may be coupled to temperature control means for controlling the ambient temperature inside the heating chamber 14.

The optimum workspace 12 dimensions as defined by the heating chamber 14 should produce a maximum number of effective frequency modes and well distributed voltage standing waves. The following expression, which gives a resonant wave length ($\lambda_r$) in a cavity was used:

$$\lambda_r = \frac{2}{[(m/a)^2 + (n/b)^2 + (p/c)^2]^{\frac{1}{2}}}$$

where a, b, and c are the cavity (workspace) dimensions and m, n, and p are integers giving the number of voltage standing waves that occur in the a, b, and c dimensions respectively.

In a preferred embodiment of the invention, within an effective microwave frequency range of 2,450 ± 10 megahertz (MHz), the optimum dimensions of the heating chamber 14 were found to be 25 cm wide by 27 cm high by 29 cm deep. Austenitic stainless steel type 304L was chosen for the heating chamber 14 since it has high electrical conductivity, good oxidation resistance and excellent welding characteristics. Sheets of 3.2 mm thickness were used for the top 16, bottom 18 and rear 20 of the heating chamber 14, and for the side walls 22 3 mm thick sheets uniformly perforated with 4 mm diameter holes (18,000 per m²) were used to allow maximum convectional heat transfer while preventing microwave leakage.

The heating chamber 14 preferably has a circular access port 15 with a tight-fitting access door (not shown), designed in known fashion to resist microwave energy leakage and to prevent arcing. The access opening in the kiln 10 should preferably be large enough to allow the entire heating chamber 14 to be inserted or removed for easy cleaning, repair or replacement. To allow for visual inspection and temperature measurement of the ceramic, view ports with double quartz glazing may be located in the access doors.

The microwave waveguide 30 is also preferably formed from 304L stainless steel. The waveguide is preferably about 30 cm long which allows a 15 cm long waveguide section 31 to be outside the kiln 10. Cooling of the waveguide 30 may be provided by coolant pumped through copper tubing (not shown) wound around the external waveguide section 31.

The secondary chambers 24 are designed to obtain a maximum temperature of 1,200° C. with an average heating rate of 25° C. per minute. Internal thermal insulation 34 is provided by an 'all fibre' alumina-silicate material such as CARBORUNDUM (trade-mark) The outer housing 36 of kiln 10 is constructed of mild steel coated with high temperature enamel. This insulation system should always maintain the outer surface temperature of the kiln below 40° C.

Temperature control within the workspace is provided by a silicon-controlled rectifier (SCR) and a type-K thermocouple. The floor 18 of the heating chamber 14 is lined with a perforated plate of mullite to minimize mechanical wear of the floor insulation 34.

In operation, a ceramic material to be calcined/synthesized or sintered is placed in the workspace, and the heating elements are activated. When the ambient temperature in the workspace reaches a desired level (causing a significant increase in microwave coupling, as determined by experimentation), the microwave generator is activated either manually or by known switching means to elevate the temperature of the material to the calcination or sintering temperature and maintain same. The conventional heating source may be deactivated once microwave heating has begun. Alternatively, conventional heating may continue to be applied after microwave heating has begun or even after microwave heating has been stopped.

SPECIFIC EXAMPLES

The invention was used to process several ceramic materials. They included

Calcination/Synthesis
  Alumina ($Al_2O_3$) from alumina trihydrate ($Al_2O_3 3H_2O$)
  Barium titanate ($BaTiO_3$) from barium oxide (BaO) and
  titanium dioxide ($TiO_2$)
Sintering
  Alumina ($Al_2O_3$)
  Zinc Oxide (ZnO)

An infrared (IR) pyrometer was used to sense the temperature of the ceramic materials being processed in the workspace 12. The IR pyrometer readings were calibrated against those of a thermocouple. The differences between the two temperature readings in the 200°-750° C. range increased with increasing temperature. An extensive calibration procedure for the IR pyrometer may be required to cover each different ceramic material over a given temperature range. Furthermore, the temperature measured by an IR pyrometer represents the surface temperature of a sample; during the application of microwave radiation the internal temperature is usually higher than the surface temperature. Other equipment may be used to measure temperature more accurately. In particular, high temperature optical fibre probes are very suitable for this application.

In general, the selected materials were preheated to the 200°-600° C. range using conventional heating, followed by microwave heating at various power levels.

EXAMPLE 1

Figure 3:
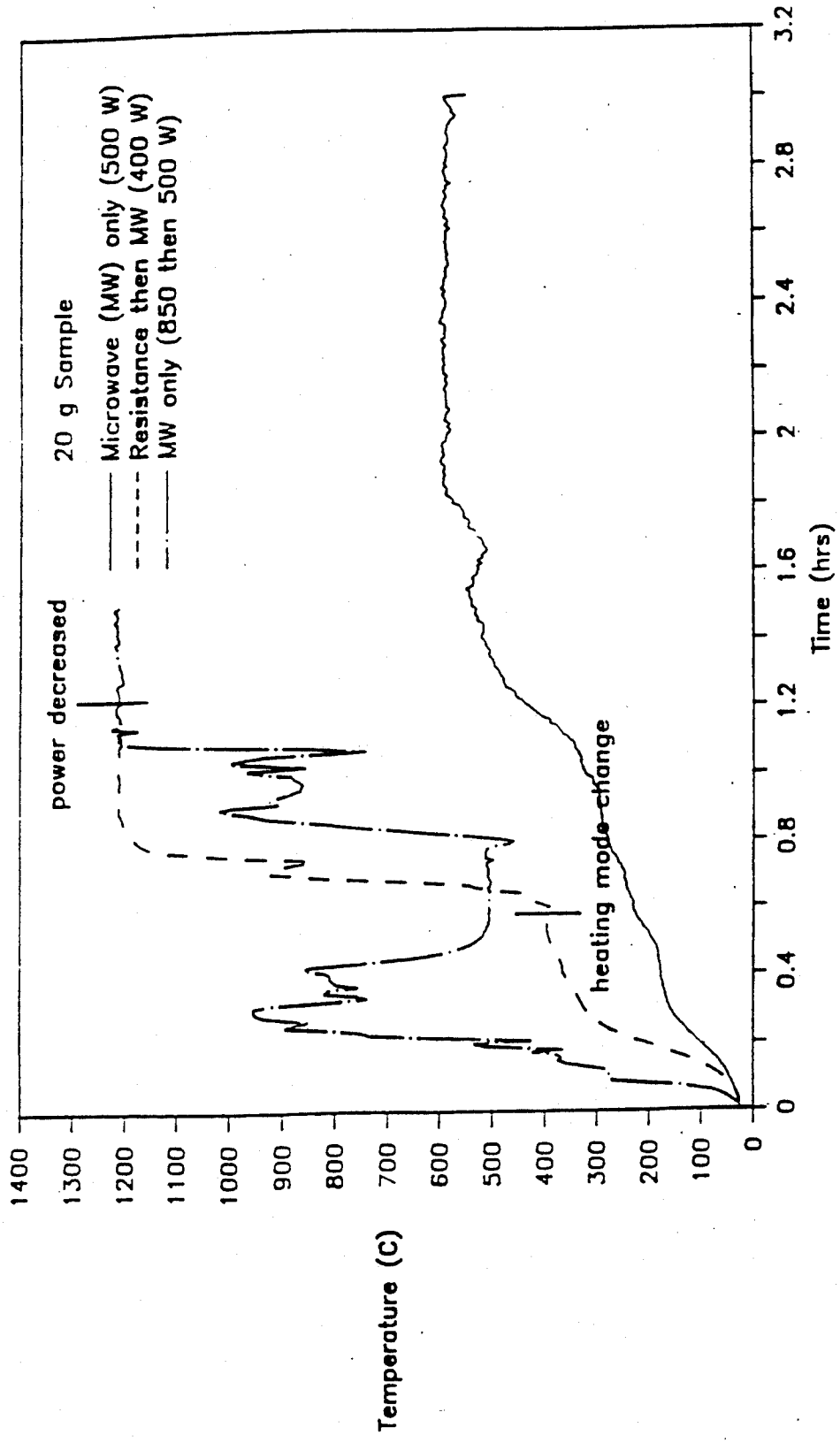
FIG. 3 is a graphical representation comparing the method of the present invention to conventional heating methods in the calcination/synthesis of alumina trihydrate to alumina.

With respect to calcination/synthesis of alumina trihydrate to alumina, FIG. 3 illustrates the advantages of calcinating this material by the use of conventional heating following by microwave heating versus using microwave heating only. As shown, using 850 W of microwave power, a 20 g sample of alumina trihydrate was heated to approximately 1200° C. in one hour whereupon the microwave power was reduced to 500 W to maintain this temperature. By preheating another 20 g sample to 400° C. and then exposing it to 400 W of microwave power, the sample reached the calcination temperature of 200° C. in a total time of 45 minutes (35 minutes of electric resistance heating plus 10 minutes of microwave heating).

Characterization of the sample, processed by a combination of conventional and microwave heating, using X-ray traction techniques indicated that alumina trihydrate powder had been completely transformed to alumina. In contrast, conventional heating for one hour at 1200° C. (plus about 72 minutes to preheat the kiln to 1200° C.) did not produce the required alumina phase. Scanning electron microscopy and the sample calcinated in the hybrid kiln indicated that the grains of the alumina were fairly uniform with an average grain size of the microns. The grains were relatively fine considering that no process optimization was undertaken.

EXAMPLE 2

Figure 4:
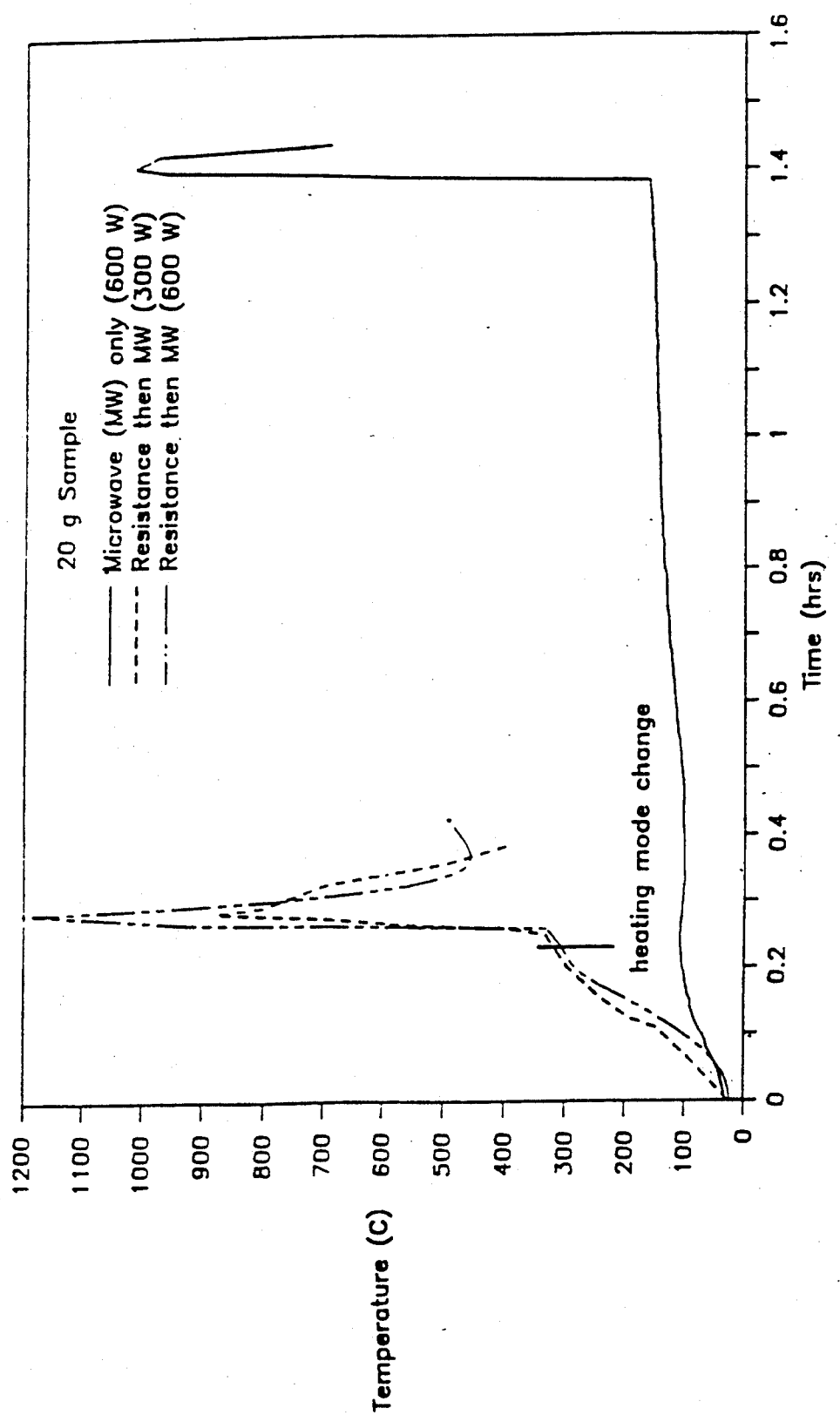
FIG. 4 is a graphical illustration comparing the method of the subject invention to conventional heating in the calcination/synthesis of barium titanate from barium oxide and titanium dioxide.

With respect to calcinating/synthesizing barium titanate from barium oxide and titanium dioxide, FIG. 4 illustrates the advantages of applying sequentially conventional electric heating following microwave heating versus applying only microwave heating. As shown, using 600 W of microwave power, a 20 g sample required 1.5 hours for complete calcination. X-ray diffraction analysis indicated that the sample was fully transformed to barium titanate in the expected tetragonal phase, but a high temperature hexagonal $BaTiO_{2.997}$ was also present. A significant reduction in processing time occurred when samples were first heated by conventional means then by microwave means. The two samples were preheated to 300° C., one sample was followed by 300 W of microwave heating while the other sample was followed by 600 W of microwave heating. The 300 W sample contained a lower amount of hexagonal phase barium titanate. It was clear that the main difference between the two cases was the maximum temperature attained (at 600 W, $T_{max}=1180°$ C; at 300 W, $T_{max}=900°$ C.). It was apparent that the maximum temperature (surface temperature as measured by IR pyrometer) should not exceed 900° C. 100 g samples of barium oxide and titanium dioxide were also calcinated.

A typical temperature profile is shown in FIG. 4. With resistance heating and microwave heating (600 W), the total time for calcination of 100 g samples was 1.5 hours. The X-ray diffraction of these samples showed only the desired tetragonal phase. A SEM photomicrograph of a calcinated 100 g sample had average grain size of approximately one micron with events of some melting and agglomeration between grains.

EXAMPLE 3

Figure 5:
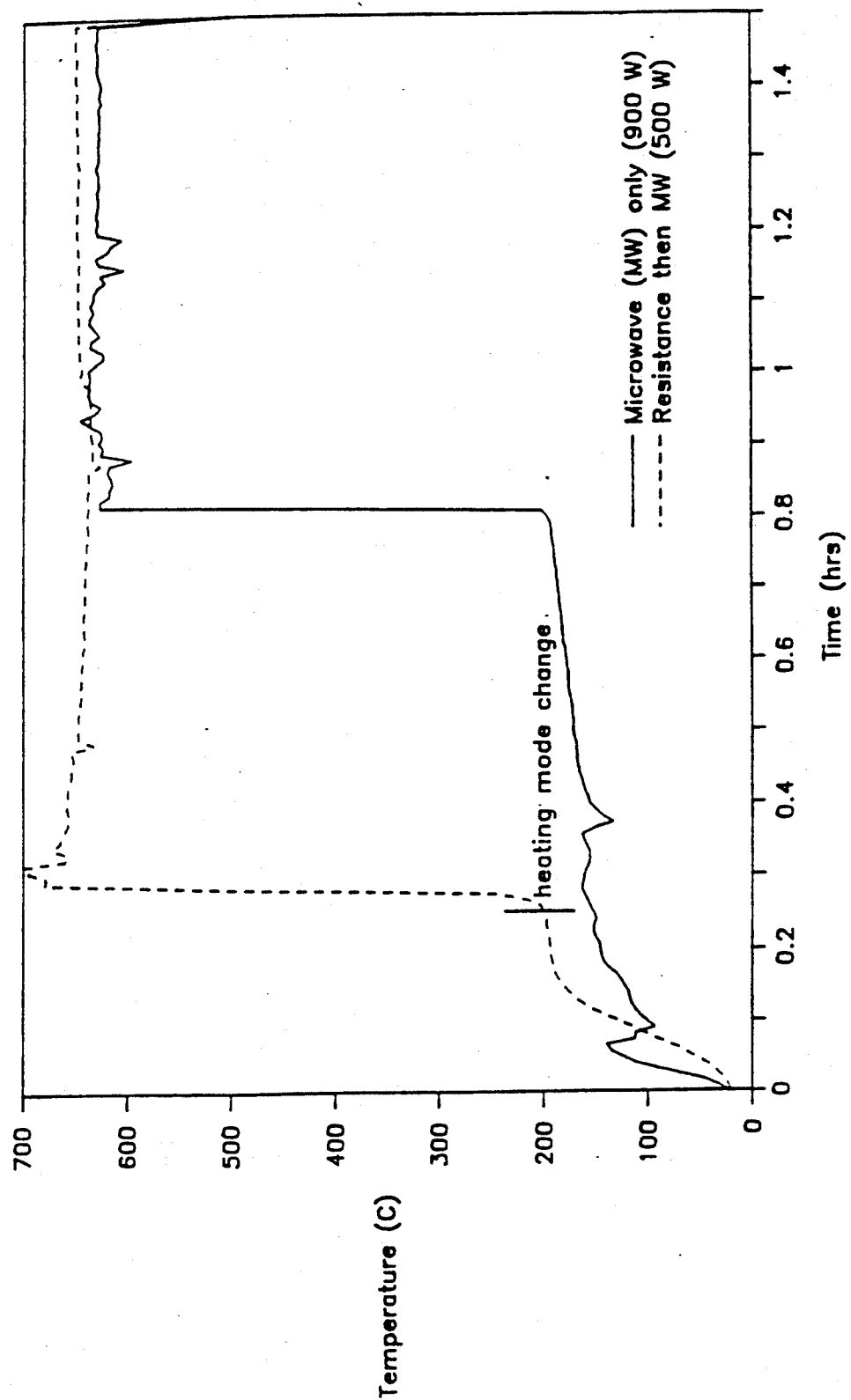
FIG. 5 is a graphical illustration comparing the method of the present invention to conventional heating in the sintering of zinc oxide.

FIG. 5 illustrates the temperature profiles of 3 gram zinc oxide samples heated by microwave (900 W) and by applying convectional preheating to a sample temperature of 200° C. followed by microwave heating at 500 W. By using 500 W of microwave power, the temperature of the sample was kept constant at 650° C. (as measured by the IR pyrometer) for 70 minutes. The density of a sintered sample was 5.2 $g/cm^3$, which is equivalent to 94.5% of the theoretical density of pure zinc oxide. It was clear that the sintered samples had a very thin layer that was not completely sintered. Subsequent tests were undertaken with samples completed insulated with saffile. The density of an insulated sintered sample was 5.1 $g/cm^3$ (ie. 92.7% of theoretical density). However, a surface layer with a maximum thickness of 0.45 mm was still present. It is expected that zinc oxide samples may be perfectly sintered with some process optimization.

EXAMPLE 4

Using a high efficiency (high heating rate) electric kiln, the actual convectional energy consumption for alumina hydrate calcination was measured. For a 20 g sample, a dwell time of 2 hours was required at 1000° C. A 20 gram sample was heated to 1000° C. in one hour. After a two hour dwell period at this temperature, the kiln was turned off and the sample was allowed to cool within the kiln. The total energy consumption for calcination of 20 g of alumina trihydrate by convectional electric heating was 6.0 kWh. By comparison, the hybrid kiln total energy consumption to calcinate 20 g sample was 5.07 kWh. Convectional heating consumed 18% more electrical energy than the combined use of convectional and microwave heating. Similarly, the calcination of barium titanate by the hybrid kiln was determined to be 1.7 kWh as compared to 6.0 kWh by convectional heating.

Alumina used for sintering tests was the A-16, 99.7% pure type. The average grain size of this powder was less than one micrometer. Samples weighing 5, 20 and 40 grams were prepared for sintering.

Using 900 W of microwave power, none of the samples exceeded a temperature of 250° C. in a period of 1.5 hours. Pure alumina has a very low dielectric loss factor at ambient temperatures. However, at temperatures near 500° C. the dielectric loss factor of pure alumina increases significantly. The invention was applied using a heating schedule of preheating by convectional heating to 500° C. followed by 900 W of microwave heating. A 20 g sample insulated with Saffile fibre insulation was heated under these conditions. The resulting sintered sample showed no cracks and was uniformly sintered except for a minor spot on the top centre where there was evidence of melting. The measured density of the sample was 3.88 $g/cm^3$ (ie. 97% of the theoretical density). In comparison, conventional heating required 20 hours to sinter pure alumina to 96% of the theoretical density.

Using an equivalent conventional kiln, the total energy required for sintering alumina was 9 kWh (assuming a heating range of 1000° per hour with a dwell time of 2 hours). The kiln of the present invention required only 4.2 kWh to process the same amount of alumina.

We claim:
1. An apparatus for processing ceramic materials, comprising an insulated housing providing a heating chamber defining a workspace and a secondary chamber disposed adjacent to the heating chamber, the heating chamber having an interior microwave-impermeable lining enclosing the workspace and access means permitting the materials to be placed in and removed from the workspace, convectional heating means in said secondary chamber, a microwave energy source, waveguide means coupled to the heating chamber for propagating microwave energy into the heating chamber, a perforated wall separating the heating chamber and the secondary chamber to permit convectional and radiative heat transfer from the secondary chamber to the heating chamber, and temperature measuring means for measuring the temperature of the workspace and control means for selectively activating said convectional heating means for preheating the workspace to approximately 500°–600° C. and means for selectively activating the microwave energy source when the ambient temperature in the workspace has reached a selected temperature approximately corresponding to threshold temperature at which microwave absorption of a ceramic material being processed increases significantly.

2. An apparatus as defined in claim 1 including a secondary chamber disposed on each side of the heating chamber thereof, and a pair of perforated walls separating the heating chamber from the secondary chambers to permit convectional and radiative heat transfer from the secondary chambers to the heating chamber.

3. An apparatus as defined in claim 1 wherein said convectional heating means comprises electric resistance heating elements.

4. An apparatus as defined in claim 2 wherein said convectional heating means comprises electric resistance heating elements.

5. An apparatus as defined in claim 1, 2, 3 or 4 wherein the workspace dimensions are defined by the equation $$\lambda_r = \frac{2}{[(m/a)^2 + (n/b)^2 + (p/c)^2]^{\frac{1}{2}}}$$

wherein $\lambda_r$ = resonant wavelength;

a,b,c = cavity dimensions;

m,n,p = integers giving the number of voltage standing wave that occur in the a,b and c dimensions respectively.

6. An apparatus as defined in claim 1, 2, 3 or 4 wherein the lining is metallic.

* * * * *